United States Patent [19]

Saitoh et al.

[11] Patent Number: 5,184,594
[45] Date of Patent: Feb. 9, 1993

[54] FAILURE DIAGNOSIS DEVICE OF AN EGR CONTROL DEVICE

[75] Inventors: Mamoru Saitoh; Shinya Fujimoto, both of Himeji, Japan

[73] Assignee: Mitsubishi Denki Kabushiki Kaisha, Tokyo, Japan

[21] Appl. No.: 868,244

[22] Filed: Apr. 14, 1992

[30] Foreign Application Priority Data

Apr. 15, 1991 [JP] Japan .................................. 3-082247

[51] Int. Cl.[5] .......................... F02M 25/07; F02P 5/15
[52] U.S. Cl. ...................................... 123/571; 123/416
[58] Field of Search ........................ 123/406, 416, 571

[56] References Cited

U.S. PATENT DOCUMENTS

| | | | |
|---|---|---|---|
| 4,314,540 | 2/1982 | Ikeura | 123/571 |
| 4,315,492 | 2/1982 | Gardner | 123/571 |
| 4,598,684 | 7/1986 | Kato et al. | 123/571 X |
| 4,608,955 | 9/1986 | Ohtaki et al. | 123/571 X |
| 4,671,107 | 6/1987 | Chiesa et al. | 123/571 X |
| 4,715,348 | 12/1987 | Kobayashi et al. | 123/571 |
| 4,834,054 | 5/1989 | Hashimoto et al. | 123/571 X |
| 4,870,942 | 10/1989 | Shibata et al. | 123/571 X |
| 4,967,717 | 11/1990 | Miyazaki et al. | 123/571 |
| 5,014,203 | 5/1991 | Miyazaki et al. | 123/571 X |
| 5,137,004 | 8/1992 | Takahata et al. | 123/571 |

FOREIGN PATENT DOCUMENTS

| | | |
|---|---|---|
| 4015914 | 12/1990 | Fed. Rep. of Germany . |
| 0027922 | 3/1977 | Japan ................................... 123/571 |
| 62-51746 | 3/1987 | Japan . |
| 0051747 | 3/1987 | Japan ................................... 123/571 |

Primary Examiner—Willis R. Wolfe
Attorney, Agent, or Firm—Sughrue, Mion, Zinn, Macpeak and Seas

[57] ABSTRACT

A failure diagnosis device of an EGR control device provided with an exhaust gas recirculating passage for recirculating exhaust gas of an engine to an intake side of the engine and a recirculating valve for controlling to open and close the exhaust gas recirculating passage, which controls to open and close the recirculating valve comprising: a running condition detecting means for detecting a running condition of the engine; a failure diagnosis means for performing a failure diagnosis of the EGR control device by determining whether a difference between the first running condition when the recirculating valve is open and the second running condition when the recirculating valve is closed, is a predetermined value or more; and an ignition timing controlling means for performing an ignition timing controlling in accordance with a change of the running condition when the recirculating valve is switched from an open state to a closed state and from the closed state to the open state.

1 Claim, 5 Drawing Sheets

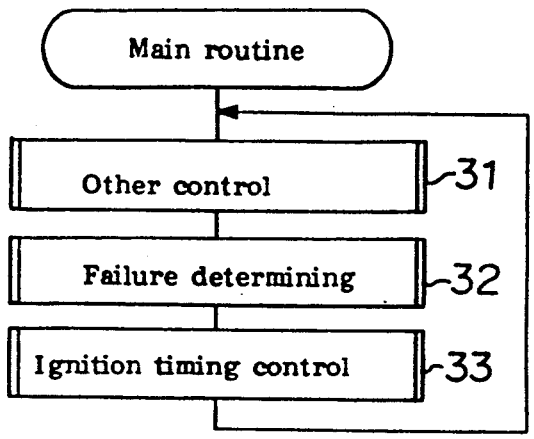
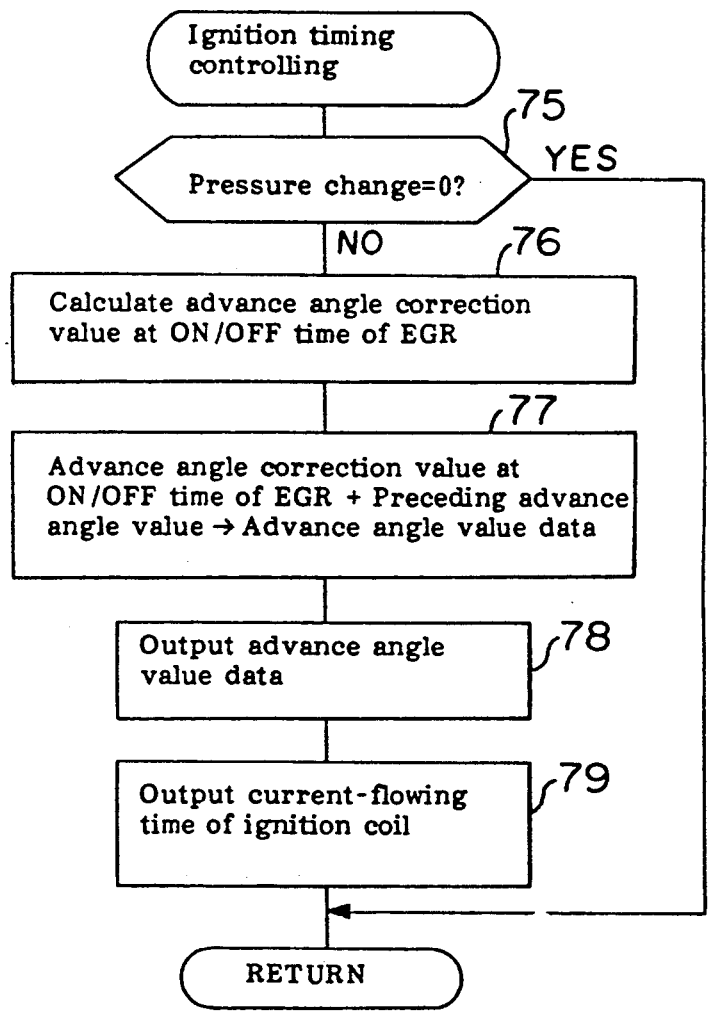

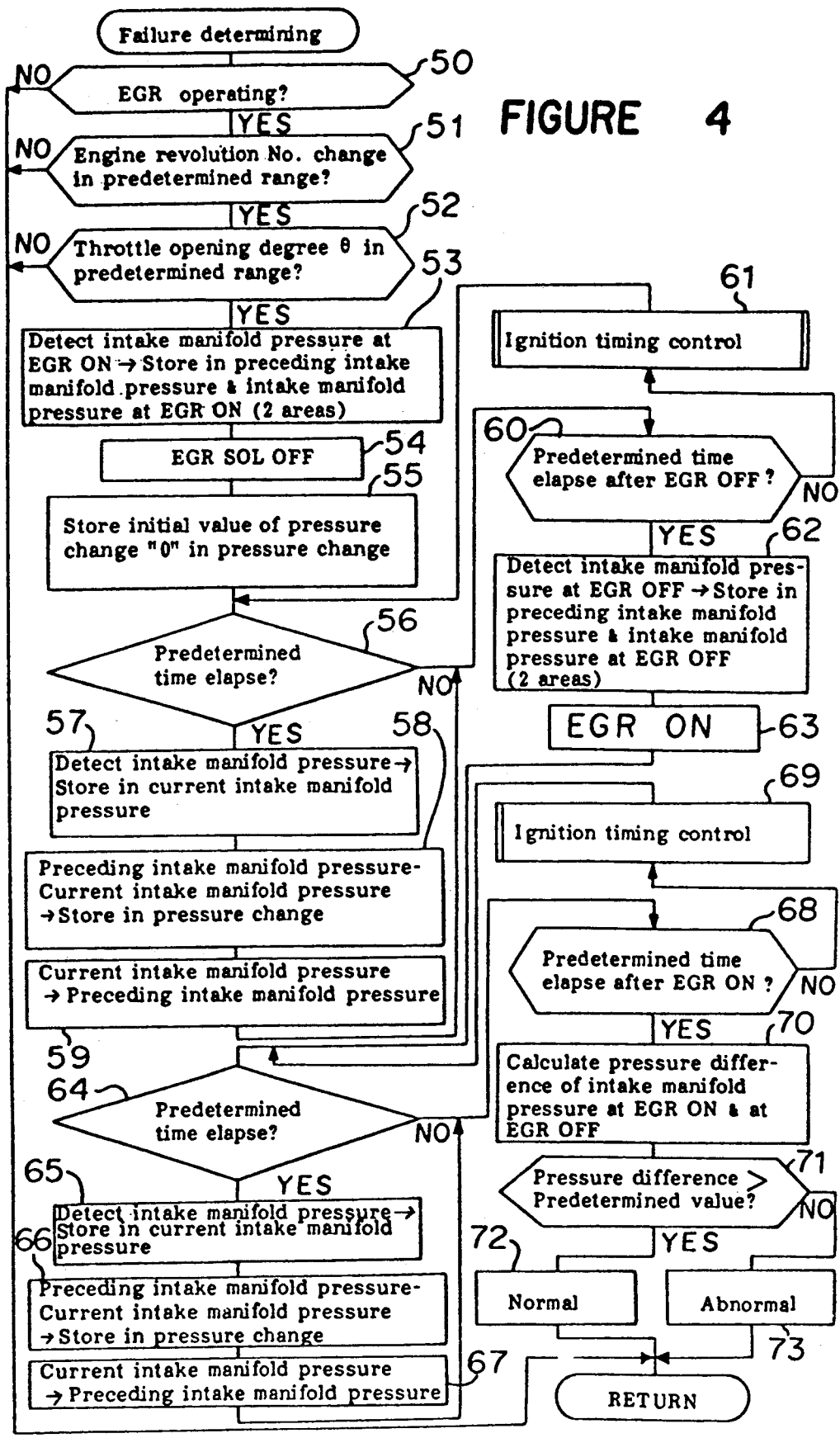

1

FAILURE DIAGNOSIS DEVICE OF AN EGR CONTROL DEVICE

BACKGROUND OF THE INVENTION

1. Field of the Invention

This invention relates to a failure diagnosis device of an EGR (exhaust gas recirculation) control device utilized in an internal combustion engine and the like.

2. Discussion of Background

An example of a conventional failure diagnosis device of an EGR control device is shown in Japanese Unexamined Patent Publication No. 51746/1987. In this conventional example, the failure diagnosis is performed by forcibly making the EGR from ON to OFF when the failure diagnosis is performed, in a domain wherein the EGR control device is operated (recirculates EGR gas in an internal combustion engine). When the EGR is normal, and the EGR is made OFF, lowering of a pressure in an intake pipe, shortening of a basic fuel injection time calculated by a change of the intake pipe pressure and a variation of an air fuel ratio from RICH to LEAN, or the like are caused. When these changes of state are not caused, the EGR is determined to be abnormal, and an alarm is issued to a driver.

The conventional failure diagnosis device of an EGR control device is composed as above, wherein it is necessary to make temporarily and forcibly OFF the EGR, and a temporary change of the intake pipe pressure causes a variation in torque of the engine, which gives shock (oscillation) to a driver.

SUMMARY OF THE INVENTION

It is an object of the present invention to solve above problems. It is an object of the present invention to provide a failure diagnosis device of an EGR control device capable of preventing to give shock to a driver by a torque variation of an engine due to ON and OFF of an EGR when failure diagnosis is performed.

According to an aspect of the present invention, there is provided a failure diagnosis device of an EGR control device provided with an exhaust gas recirculating passage for recirculating exhaust gas of an engine to an intake side of the engine and a recirculating valve for controlling to open and close the exhaust gas recirculating passage, which controls to open and close the recirculating valve comprising: a running condition detecting means for detecting a running condition of the engine; a failure diagnosis means for performing a failure diagnosis of the EGR control device by determining whether a difference between the first running condition when the recirculating valve is open and the second running condition when the recirculating valve is closed, is a predetermined value or more; and an ignition timing controlling means for performing an ignition timing controlling in accordance with a change of the running condition when the recirculating valve is switched from an open state to a closed state and from the closed state to the open state.

In this invention, a failure diagnosis of an EGR control device is performed by a difference between running conditions when a recirculating valve is open and when the recirculating valve is closed. Furthermore, when this failure diagnosis is performed, an ignition timing control is performed in accordance with a change in the running condition. Therefore, an abrupt change of the engine torque is not caused.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flowchart of a main routine of the EGR control device according to the present invention;

FIG. 4 is a flowchart of a failure determining routine of the EGR control device according to the present invention;

FIG. 5 is a flowchart of an ignition timing controlling routine of the EGR control device according to the present invention.

DETAILED DESCRIPTION OF THE PREFERRED EMBODIMENTS

Figure 1:
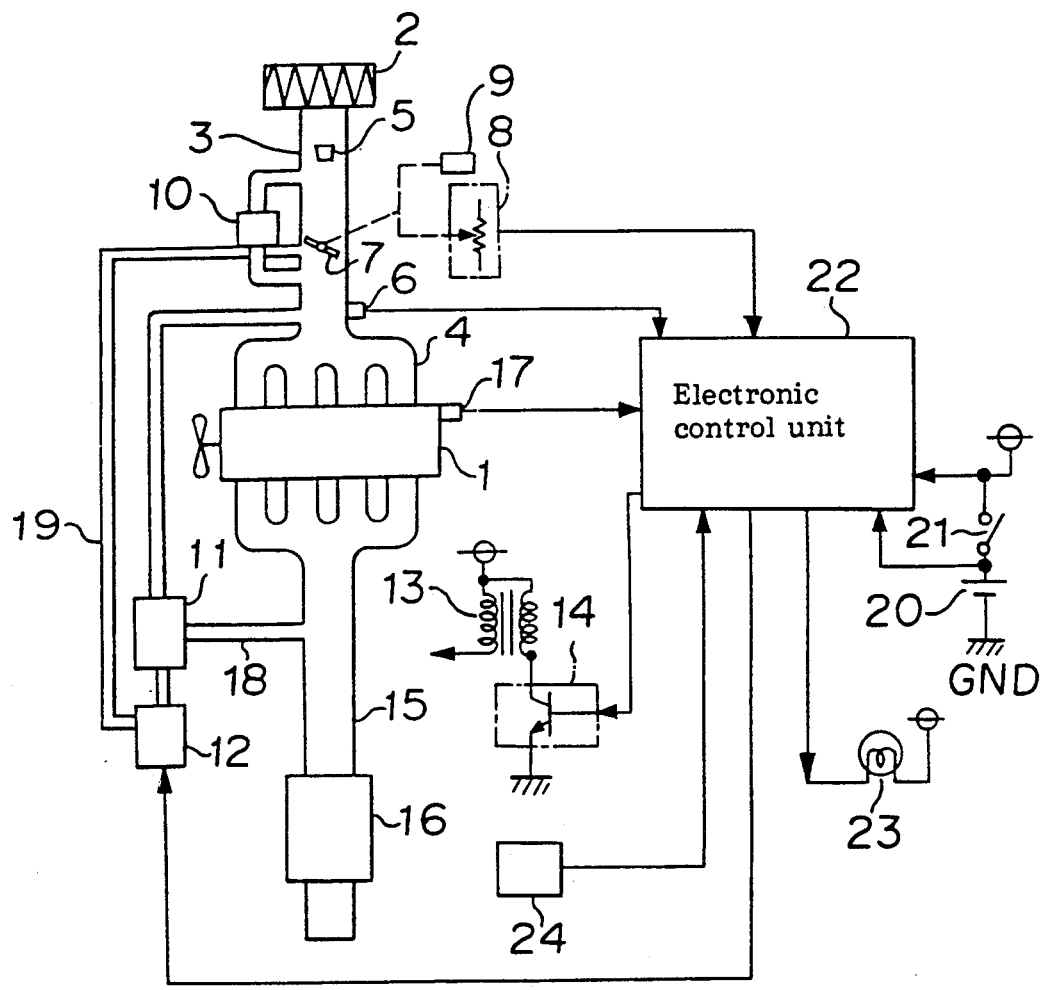
FIG. 1 is a construction diagram of an EGR control device according to the present invention.

An embodiment of the present invention will be explained referring to the drawings as follows.

FIG. 1 shows an embodiment of construction of the EGR control device, wherein a reference numeral 1 designates an engine and 6, a pressure sensor for detecting an intake air pressure for measuring a quantity of air sucked to the engine 1 through an air cleaner 2, an intake pipe 3 and an intake manifold 4, which is composed of a semiconductor pressure sensor. A reference numeral 5 designates an injector, provided on the upstream side of a throttle valve 7, which injects fuel. A numeral 8 designates a throttle opening degree sensor for detecting an opening degree of the throttle valve 7 and 9, an accelerator.

A numeral 10 designates a bypass valve, and 17, a water temperature sensor for detecting a cooling water temperature of the engine, which is a thermistor type sensor. A numeral 24 designates a crank angle sensor, which transmits an output signal of a crank angle to an electronic control unit 22. The electronic control unit transmits a signal to an igniter 14, and an ignition coil 13 performs ignition by a signal from an igniter 14.

A numeral 15 designates an exhaust pipe, 16, a catalyst, 18, an exhaust gas recirculation passage for recirculating exhaust gas from intake side to exhaust side, and 11, a vacuum servo type recirculation valve provided at the exhaust gas recirculating passage 18. A numeral 12 designates a solenoid for controlling the recirculating valve, which is provided at a pipe 19 that connects a diaphragm chamber of the recirculating valve 11 with the intake pipe 3, and controls a negative pressure to the diaphragm chamber of the recirculating valve 11 by a signal from the electronic control unit 22. By the negative pressure of the diaphragm chamber a passage of the recirculating valve 11 is made open and closed.

The electronic control unit 22 receives respective signals of the pressure sensor 6, the crank angle sensor 24, the water temperature sensor 17 and the throttle opening degree sensor 8. The electronic control unit 22 performs a failure diagnosis of the EGR control device by controlling ON/OFF of the passage of the EGR recirculating valve 11 under a predetermined condition, that is, by making ON/OFF the solenoid for controlling the recirculating valve 12 which controls ON/OFF of the EGR, and performs an ignition timing control by obtaining a target ignition timing and a current-flowing time of the ignition coil 13, by a signal of the pressure sensor 6 which is inputted in accordance with ON/OFF of the solenoid for controlling the recirculating valve 12 and by transmitting an ignition output signal to the igniter 14. A numeral 20 designates a battery, 21, an ignition key switch and 23, an alarming lamp.

Figure 2:
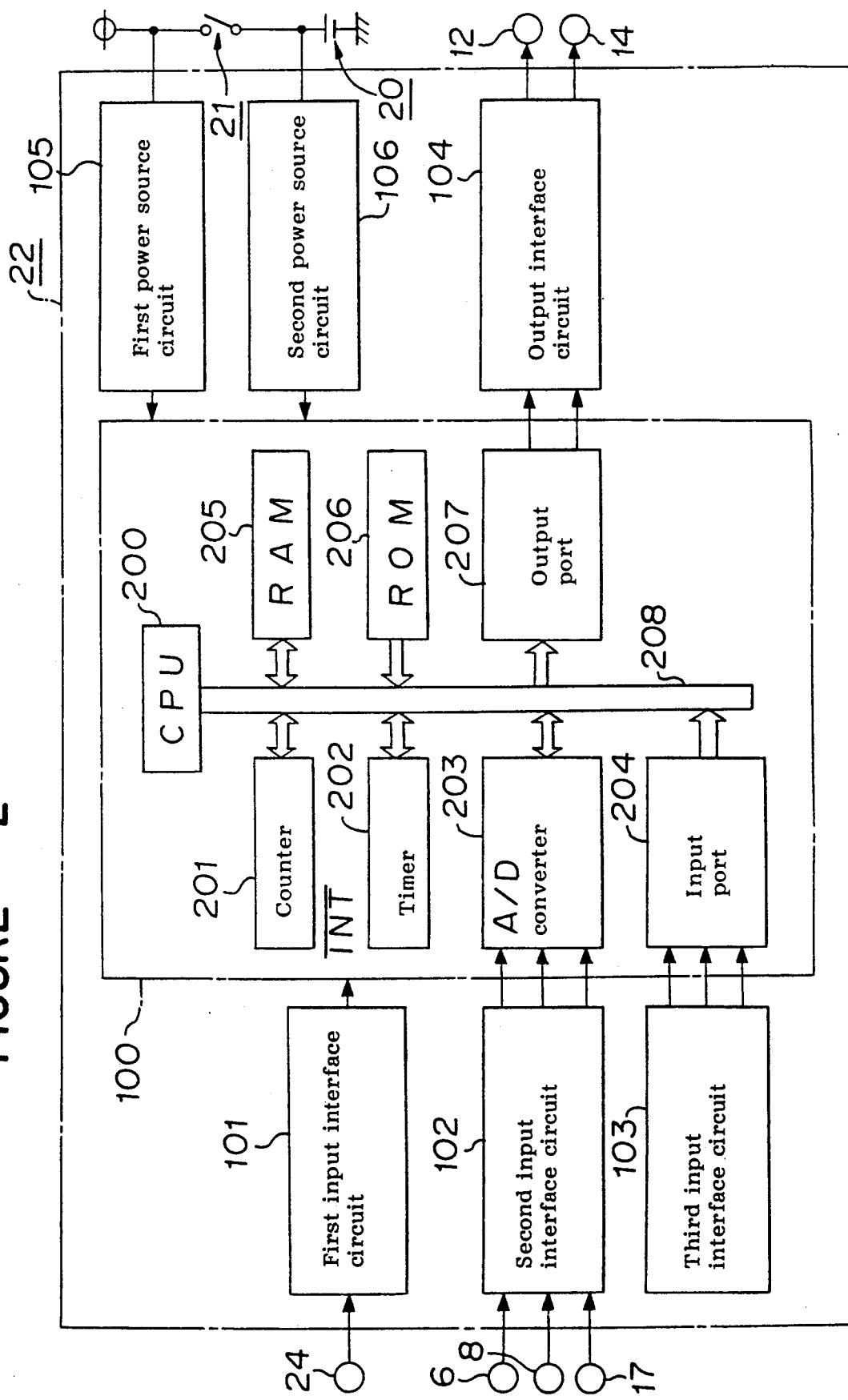
FIG. 2 is a construction diagram of an electronic control unit according to the present invention.

FIG. 2 shows construction of the electronic control unit 22, wherein a reference numeral 100 designates a microcomputer, composed of a CPU 200 that performs a failure diagnosis of an EGR control device and calculates an ignition correction quantity in an ignition timing control and the like following a predetermined program, a free running counter 201 for measuring a rotational period of the engine 1, a timer 202 for determining a measuring timing of a pressure change when the EGR control device performs a failure determining, an A/D converter 203 for converting an analogue input signal to a digital signal, an input port 204, a RAM 205 as a work memory, a ROM 206 for storing operation programs, an output port 207 for outputting a drive signal of the solenoid for controlling the recirculating valve 12 and an ignition signal of the igniter 14, and a common bus 208.

A reference numeral 101 designates a first input interface circuit, which outputs a signal from the crank angle sensor 24 to the microcomputer 100 as an interruption signal. When this interruption signal is generated, the CPU 200 reads a value of the counter 201, calculates a period of revolution number of the engine based on a difference between the value and a preceding value, and stores it in the RAM 205. A numeral 102 designates a second input interface circuit, which receives signals of the pressure sensor 6, the throttle opening degree sensor 8 and the water temperature sensor 17, and outputs them to the A/D convertor 203 after removing noise components thereof.

A reference numeral 103 designates a third input interface circuit, an output of which is inputted to the input port 204. A numeral 104 designates an output interface circuit, which amplifies signals of the output port 207 and outputs them to the solenoid for controlling the recirculating valve 12 and the igniter 14. Reference numerals 105 and 106 are a first and a second power source circuits.

Next, explanation will be given to a main routine in FIG. 3. FIG. 3 shows a flowchart of this embodiment of an engine control, wherein in step 31, the operation performs the other controls, that is, controls inside of the electronic control unit 22. The electronic control unit 22 performs a fuel injection control in accordance with informations inputted from the respective sensors. In step 32, the operation performs a failure determining, wherein a failure in the EGR control device is determined. In step 33, the operation performs an ignition timing control, wherein an ignition timing is adjusted in accordance with a change of load of the engine during the failure determining.

FIG. 4 is a failure determining routine, wherein at first, in step 50 the operation determines whether the operation is in an operational range of the EGR control device. When the operation is out of the operational range, the operation goes out of the failure determining routine, since it is not in the domain of the failure determining. When the operation is in the operational range, the operation proceeds to step 51, wherein the operation determines whether a change in the revolution number of the engine is in a predetermined range. If it is not in the predetermined range, the operation goes out of the failure determining routine, since it is not in the domain of the failure determining. When the operation is in the operation range, the operation precedes to step 52, wherein the operation determines whether a change of the throttle opening degree is in a predetermined range. When it is not in the predetermined range, the operation goes out of the failure determining routine.

When the operation is in the predetermined range, the operation proceeds to step 53, wherein the operation detects a pressure in the intake manifold 4 when the EGR control is operating, by the pressure sensor 6, and based on a program in the ROM 206, stores it in a data area for memorizing a preceding intake manifold pressure in the RAM 205 and in another data area for memorizing the intake manifold pressure when the EGR is operating. When the storing is finished, the operation proceeds to step 54, wherein the operation makes the EGR SOL, that is , the solenoid for controlling the recirculating valve 12 OFF and proceeds to step 55.

In step 55, the operation stores "0" as an initial value of a pressure change in the data area for memorizing the pressure change in the RAM 205, and proceeds to step 56. In step 56, the operation determines whether time elapses from when the solenoid for controlling the recirculating valve 12 is made OFF, to the next step. When the predetermined time elapses, the operation proceeds to step 57. If not, the operation proceeds to step 60. In step 57, the operation detects the intake manifold pressure, stores it in an data area for memorizing the current intake manifold pressure in the RAM205, and proceeds to step 58 wherein the operation calculates the pressure change.

The operation obtains the pressure change by subtracting the current intake manifold pressure memorized in the RAM 205 in step 57, from the preceding intake manifold pressure memorized in the RAM 205 in step 53. The operation stores the pressure change in the RAM 205 and proceeds to step 59 wherein the operation stores the current intake manifold pressure in the data area for memorizing the preceding intake manifold pressure in the RAM 205 and proceeds to step 60. The operation proceeds to step 60 when the predetermined time does not elapse from when the solenoid 12 is made OFF in step 56. In step 60, the operation determines whether a predetermined time from when the solenoid 12 is made OFF to when the intake manifold pressure is stabilized (which is longer than the predetermined time in step 56) elapses. When it elapses the operation proceeds to step 62. If not, the operation proceeds to step 61.

In step 61, the operation performs the ignition timing control in accordance with a pressure change when the solenoid 12 is switched from ON to OFF. In step 62, the operation detects the intake manifold pressure when the EGR is not operated, stores it in the data area for memorizing the intake manifold pressure when the EGR is not operated and the data area for memorizing the preceding intake manifold pressure, in the RAM 205, and proceeds to step 63. In step 63 the operation restarts the EGR operation by making the solenoid 12 ON, and proceeds to step 64.

The treatments in steps 64 through 69 are the same with those of steps 56 through 61, and the explanation is omitted. However, there is a difference between step 60 and 68 which is the difference between after EGR OFF and after EGR ON. When a predetermined time elapses after EGR ON in step 68, the operation performs a calculation for the failure determining in step 70. In step 70, the operation subtracts the intake manifold pressure for when the EGR is not operated, memorized in the RAM 205 in step 62, from the intake manifold pressure when the EGR is operated, memorized in the RAM 205 in step 53, and proceeds to step 71.

In step 71, the operation compares the pressure difference calculated in step 70 with a predetermined value of pressure of a failure determining level. When the pressure difference is larger than the predetermined pressure value, the operation determines that the device is normal. When the pressure difference is smaller than the predetermined value of pressure, the operation determines that the EGR control devices abnormal, and turns on the alarming lamp 23 which informs that the EGR control device is in failure. The above operations are repeated.

Figure 6:
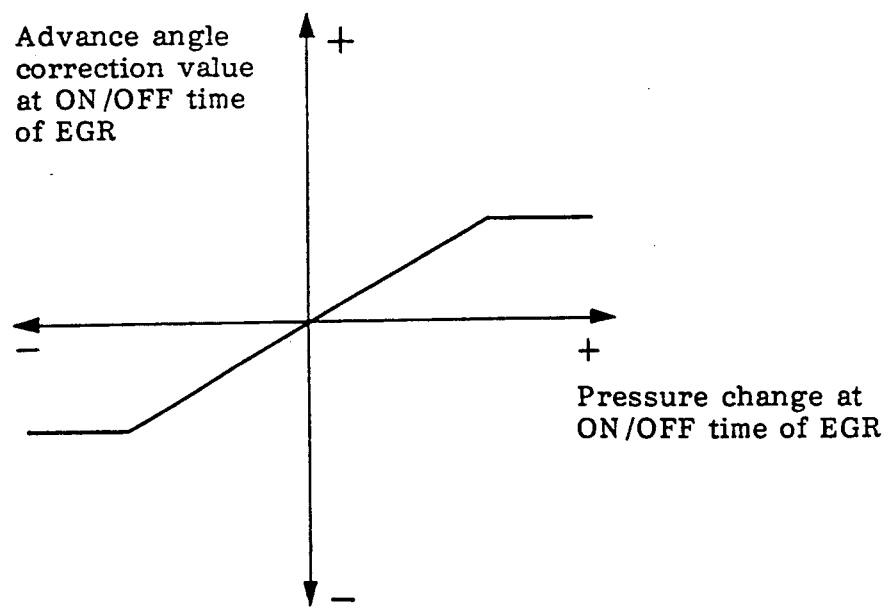
FIG. 6 is a characteristic diagram of a correction quantity in the ignition timing control according to the present invention.

FIG. 5 shows a flowchart of the ignition timing control in steps 61 and 69. In step 75, the operation determines whether a change of the intake manifold pressure when the solenoid 12 is switched from ON to OFF, or from OFF to ON, is zero. If it is not zero, the operation proceeds to step 76. FIG. 6 shows a relationship between a pressure change at ON/OFF switching time of EGR and advance angle correction value at ON/OFF switching time of EGR, wherein the ignition timing is corrected to retard angle side when the EGR is switched from ON to OFF, and the ignition timing is corrected to advance angle side when the EGR is switched from ON to OFF. In step 76, the operation calculates an advance correction value in accordance with the pressure change when the EGR is switched from ON to OFF or from OFF to ON following the relationship of FIG. 6. In step 77, the operation adds a preceding advance angle value to the advance angle correction value, thereby obtaining a new advance angle value data.

In step 78, the operation outputs the advance angle value data. In step 79, the operation outputs a current-flowing time data of the ignition coil 13, and performs the ignition timing control by flowing current in the ignition coil 13 for a predetermined time.

In the above example, the ignition timing control is performed in accordance with the pressure change which is generated when the recirculating valve 11 is temporarily switched from ON to OFF and from OFF to ON when the failure diagnosis is carried out. Therefore, the torque variation of the engine is restricted and the shock to the driver is prevented.

As stated above, according to the present invention, the advance angle control and the retard angle control of the ignition timing are performed in accordance with the change of the running condition of the engine, when the EGR is switched from ON to OFF and from OFF to ON when the failure diagnosis is performed. Therefore, the variation of the engine torque at this occasion is alleviated and shock to driver is prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A failure diagnosis device of an EGR control device provided with an exhaust gas recirculating passage for recirculating exhaust gas of an engine to an intake side of the engine and a recirculating valve for controlling to open and close the exhaust gas recirculating passage, which controls to open and close the recirculating valve comprising:

a running condition detecting means for detecting a running condition of the engine;

a failure diagnosis means for performing a failure diagnosis of the EGR control device by determining whether a difference between the first running condition when the recirculating valve is open and the second running condition when the recirculating valve is closed, is a predetermined value or more; and an ignition timing controlling means for performing an ignition timing controlling in accordance with a change of the running condition when the recirculating valve is switched from an open state to a closed state and from the closed state to the open state.

* * * * *